(12) United States Patent
Wang et al.

(10) Patent No.: US 11,301,198 B2
(45) Date of Patent: Apr. 12, 2022

(54) METHOD FOR INFORMATION DISPLAY, PROCESSING DEVICE, AND DISPLAY SYSTEM

(71) Applicant: Industrial Technology Research Institute, Hsinchu (TW)

(72) Inventors: Li-Hung Wang, Keelung (TW); Yu-Hsiang Tsai, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/820,694

(22) Filed: Mar. 16, 2020

(65) Prior Publication Data
US 2021/0200498 A1 Jul. 1, 2021

(30) Foreign Application Priority Data
Dec. 25, 2019 (TW) .................................. 108147615

(51) Int. Cl.
*G06F 3/14* (2006.01)
*G06T 7/292* (2017.01)
(Continued)

(52) U.S. Cl.
CPC ............ *G06F 3/1446* (2013.01); *G06F 17/16* (2013.01); *G06T 7/292* (2017.01); *G06T 7/85* (2017.01); *G06T 2207/30196* (2013.01)

(58) Field of Classification Search
CPC ....... G06F 3/1446; G06F 17/16; G06T 7/292; G06T 7/85; G06T 2207/30196
See application file for complete search history.

(56) References Cited

U.S. PATENT DOCUMENTS 7,168,813 B2 * 1/2007 Wong ...................... G02B 6/06
353/120
7,438,685 B2 * 10/2008 Burdette .............. A61B 6/5247
600/439

(Continued)

FOREIGN PATENT DOCUMENTS

CN 106384365 2/2017
TW I522650 2/2016
(Continued)

OTHER PUBLICATIONS

"Office Action of Taiwan Counterpart Application", dated Dec. 10, 2020, p. 1-p. 7.

*Primary Examiner* — William Lu
(74) *Attorney, Agent, or Firm* — JCIPRNET (57) ABSTRACT

A method for information display, a processing device, and a display system are disclosed. The display system includes a light transmissive display screen, at least one first information extraction device, at least one second information extraction device, and a processing device. The processing device is connected to a display screen, the first information extraction device, and the second information extraction device. The first information extraction device extracts position information of a user. The second information extraction device extracts position information of a target object. The processing device constructs a fixed reference coordinate system, locates initial positions of the user, the target object, and the display screen, accordingly displays a fused image on the display screen, and updates the fused image displayed on the display screen according to at least one of a movement amount of the display screen and a movement amount of the user.

21 Claims, 9 Drawing Sheets

(51) Int. Cl.
 *G06T 7/80* (2017.01)
 *G06F 17/16* (2006.01)

(56) References Cited

U.S. PATENT DOCUMENTS

| | | | |
|---|---|---|---|
| 8,090,429 B2 | 1/2012 | Vija et al. | |
| 10,016,243 B2 | 7/2018 | Esterberg | |
| 10,180,715 B2* | 1/2019 | Fein | G06F 3/011 |
| 10,551,826 B2* | 2/2020 | Popa-Simil | G05B 19/4184 |
| 10,795,158 B2* | 10/2020 | Rouzes | G06F 3/011 |
| 2007/0242899 A1* | 10/2007 | Satoh | G06T 7/246 |
| | | | 382/286 |
| 2009/0275830 A1* | 11/2009 | Falco | A61B 8/4245 |
| | | | 600/437 |
| 2010/0045701 A1 | 2/2010 | Scott et al. | |
| 2012/0243732 A1* | 9/2012 | Swaminathan | G06T 7/246 |
| | | | 382/103 |
| 2014/0022283 A1* | 1/2014 | Chan | G06F 3/147 |
| | | | 345/633 |
| 2014/0191947 A1* | 7/2014 | Sharma | G06F 3/0346 |
| | | | 345/156 |
| 2016/0188181 A1* | 6/2016 | Smith | G06F 3/04883 |
| | | | 715/765 |
| 2017/0053437 A1* | 2/2017 | Ye | G06T 19/006 |
| 2018/0093110 A1* | 4/2018 | Berlinger | A61N 5/1064 |
| 2018/0303558 A1* | 10/2018 | Thomas | A61B 34/20 |
| 2019/0142519 A1* | 5/2019 | Siemionow | A61B 34/10 |
| | | | 600/408 |

FOREIGN PATENT DOCUMENTS

| | | |
|---|---|---|
| TW | 201728963 | 8/2017 |
| TW | I633336 | 8/2018 |
| TW | I651657 | 2/2019 |
| TW | 201919393 | 5/2019 |
| WO | 2008149712 | 12/2008 |

* cited by examiner

METHOD FOR INFORMATION DISPLAY, PROCESSING DEVICE, AND DISPLAY SYSTEM

CROSS-REFERENCE TO RELATED APPLICATION

This application claims the priority benefit of Taiwan application serial no. 108147615, filed on Dec. 25, 2019. The entirety of the above-mentioned patent application is hereby incorporated by reference herein.

TECHNICAL FIELD

The disclosure relates to a technology for information display.

BACKGROUND

With the development of image processing technologies and spatial orientation technologies, the application of transparent display screens has been gradually gaining attention. Such technologies allow display screens to be matched with physical objects, supplemented by virtual related information, and bring interactive experiences according to users' demands, thus presenting information in a more intuitive way.

However, to fuse images, the display system needs to convert the user, a physical object, and a display screen to a same coordinate system, and then calculate the sizes and the positions of virtual objects projected onto the screen according to the position of the user to generate a fused image. If the posture of the display screen changes, the system parameters (such as height and inclination angle, etc.) of the display screen need to be detected again to construct a new coordinate system, and after the user, the physical object, and the display screen are converted to the new coordinate system, the sizes and the positions of the virtual objects projected onto the display screen need to be calculated again. Therefore, the computation is time-consuming.

SUMMARY

The disclosure provides a method for information display, a processing device, and a display system.

In an exemplary embodiment of the disclosure, the display system includes a light transmissive display screen, at least one first information extraction device, at least one second information extraction device, and a processing device, and the processing device is connected to the display screen, the at least one first information extraction device, and the at least one second information extraction device. The at least one first information extraction device is configured to extract position information of a user. The at least one second information extraction device is configured to extract position information of a target object. The processing device is configured to construct a fixed reference coordinate system, locate an initial position of the user, an initial position of the target object, and an initial position of the display screen, display a fused image on the display screen according to the initial position of the user, the initial position of the target object, and the initial position of the display screen, and update the fused image displayed on the display screen according to at least one of a movement amount of the display screen and a movement amount of the user.

In an exemplary embodiment of the disclosure, the method for information display is applicable to a display system including a light transmissive display screen, at least one first information extraction device, at least one second information extraction device, and a processing device, the at least one first information extraction device is configured to extract position information of a user, and the at least one second information extraction device is configured to extract position information of a target object. The method for information display includes constructing a fixed reference coordinate system, locating an initial position of the user, an initial position of the target object, and an initial position of the display screen, displaying a fused image on the display screen according to the initial position of the user, the initial position of the target object, and the initial position of the display screen, and updating the fused image displayed on the display screen according to at least one of a movement amount of the display screen and a movement amount of the user.

In an exemplary embodiment of the disclosure, the processing device is connected to a display screen, a first information extraction device, and a second information extraction device, the first information extraction device is configured to extract position information of a user, and the second information extraction device is configured to extract position information of a target object. The processing device includes a memory and a processor. The memory is configured to store data. The processor is configured to construct a fixed reference coordinate system, locate an initial position of a user, an initial position of a target object, and an initial position of the display screen, display a fused image on the display screen according to the initial position of the user, the initial position of the target object, and the initial position of the display screen, and update the fused image displayed on the display screen according to at least one of a movement amount of the display screen and a movement amount of the user.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Some of the exemplary embodiments of the disclosure are to be described in detail with reference to the accompanying drawings. The component symbols referred in the following description are to be considered as the same or similar components when the same component symbol occur in different accompanying drawings. The exemplary embodiments are only a part of the disclosure, and do not disclose all implementations of the disclosure. More precisely, the exemplary embodiments are merely examples of methods, apparatuses, and systems within the scope of the patent application of the disclosure.

Figure 1:
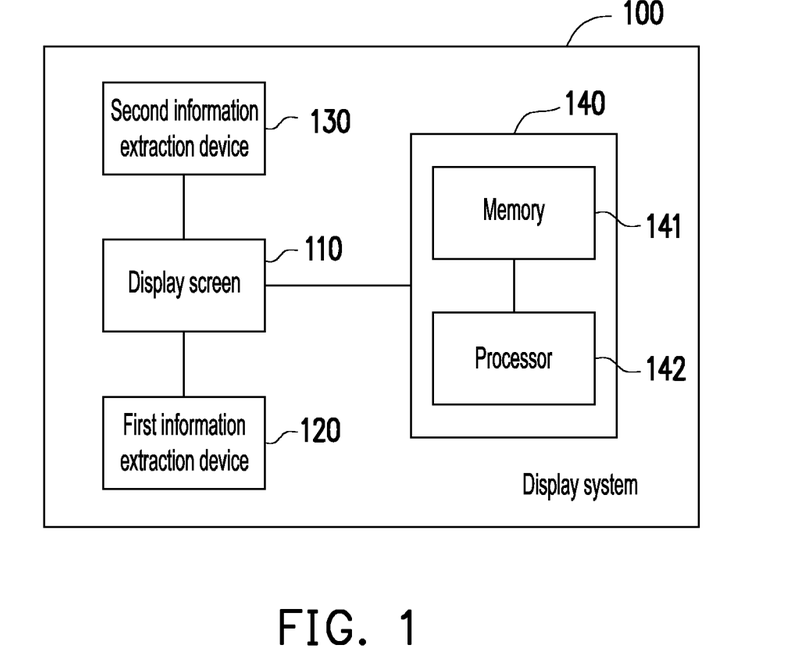
FIG. 1 is a schematic diagram illustrating a display system according to an exemplary embodiment of the disclosure.

FIG. 1 is a schematic diagram illustrating a display system according to an exemplary embodiment of the disclosure. First, FIG. 1 introduces components and configuration relationships in the display system, and then detailed functions will be disclosed together with a flowchart in a subsequent exemplary embodiment.

Referring to FIG. 1, a display system 100 in the present exemplary embodiment includes a display screen 110, at least one first information extraction device 120, at least one second information extraction device 130, and a processing device 140. The processing device 140 may be wirelessly, wiredly, or electrically connected to the display screen 110, the at least one first information extraction device 120, and the at least one second information extraction device 130.

The display screen 110 is configured to display information, and includes a penetration light transmissive display screen such as a liquid crystal display (LCD), a field sequential color LCD display, a light emitting diode (LED) display, or an electro wetting display, or a projection light transmissive display screen. Content viewed by a user by using the display screen 110 may be a physical scenario superimposed with a fused image. The at least one first information extraction device 120 is configured to extract position information of the user, and the at least one second information extraction device 130 is configured to extract position information of a target object in the physical scenario. The at least one first information extraction device 120 may be, for example, at least one image sensor or at least one image sensor matched with at least one depth sensor. The image sensor may be a visible light sensor or a non-visible light sensor such as an infrared sensor, and the depth sensor may be a light field radar or an ultrasonic sensor, that is, a device that can locate the position information of the user or a combination thereof, which belong to a scope of the at least one first information extraction device 120. Similarly, the at least one second information extraction device 130 may be, for example, at least one image sensor or at least one image sensor matched with at least one depth sensor, that is, a device that can locate the position information of the target object and identify image information of the target object or a combination thereof, which belong to a scope of the at least one second information extraction device 130. It should be understood by a persons of ordinary skill in the art that the image sensor may be configured to capture an image and may include a camera lens with a lens and a photosensitive element. The depth sensor may be configured to detect depth information, which can be divided into an active depth detecting technology and a passive depth detecting technology to implement. The active depth detecting technology, matching with a time difference ranging technology, may calculate the depth information by actively emitting a light source, an infrared ray, ultrasonic, a laser, or the like as a signal. The passive depth detecting technology may use two image sensors to simultaneously capture two images in front of them from different angles, to calculate the depth information by using a parallax of the two images.

The processing device 140 is configured to control a motion of the display system 100, and includes a memory 141 and a processor 142. The memory 141 may be, for example, any type of fixed or removable random access memory (RAM), read-only memory (ROM), flash memory, or hard disk, or other similar devices, integrated circuits and combinations thereof. The processor 142 may be, for example, a central processing unit (CPU), an application processor (AP), or other programmable general-purpose or special purpose microprocessors, a digital signal processor (DSP), an image signal processor (ISP), a graphics processing unit (GPU), or other similar devices, integrated circuits and combinations thereof.

In the present exemplary embodiment, the processing device 140 may be built in the display screen 110. The at least one first information extraction device 120 and the at least one second information extraction device 130 may be respectively disposed on two opposite sides of the display screen 110. On an upper side of a field to which the display system 100 belongs relative to the two opposite sides of the display screen 110, the positions of the user and the target object may be located, and information may be transmitted to the processing device 140 in a wired or wireless manner by using respective communications interfaces. In another exemplary embodiment, the display system 100 may be a single integrated system, and may be implemented as a head-mounted display device, a smart phone, a tablet computer, or the like, which is not limited in the disclosure. Implementation details of a method for information display are described in the following exemplary embodiments in combination with the components of the display system 100.

Figure 2:
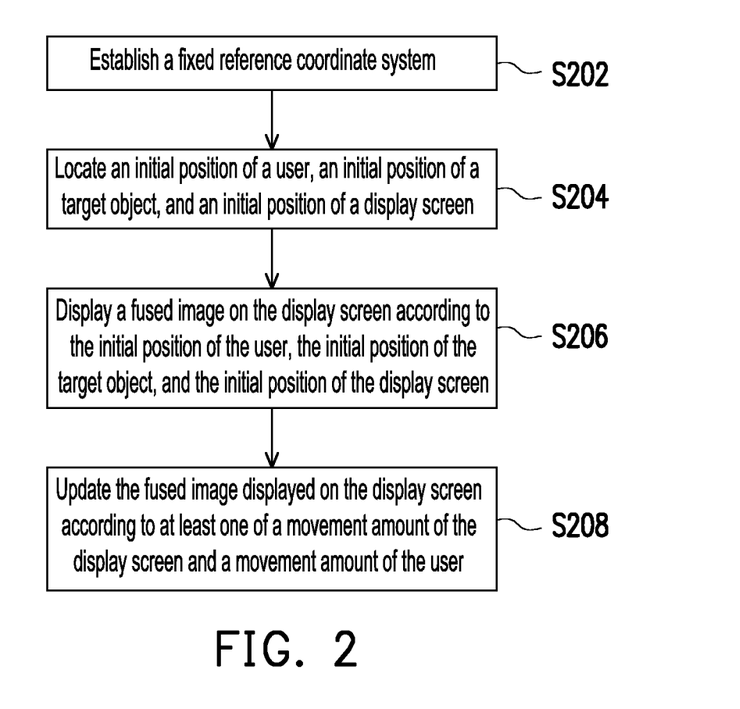
FIG. 2 is a flowchart illustrating a method for information display according to an exemplary embodiment of the disclosure.

FIG. 2 is a flowchart illustrating a method for information display according to an exemplary embodiment of the disclosure, and the method process in FIG. 2 may be implemented by the display system 100 in FIG. 1. Herein, a user may view a target object and a related fused image by using the display screen 110 of the display system 100.

Referring to FIG. 1 and FIG. 2, first, when the display system 100 is started, the processor 142 of the processing device 140 may construct a fixed reference coordinate system (step S202). The reference coordinate system herein may be, for example, a world coordinate system constructed according to the physical scenario in which the display system 100 is located, or a camera coordinate system constructed according to the at least one first information extraction device 120 and the at least one second information extraction device 130, and the reference coordinate system is stored in the memory 141 as a reference basis for subsequent calculation.

Then, the processor 142 locates an initial position of the user, an initial position of the target object, and an initial position of the display screen (step S204). The processor 142 herein may use the at least one first information extraction device 120 to extract position information of the user, and use the at least one second information extraction device 130 to extract position information of the target object. Then, the processor 142 may perform correction on the position information extracted by the at least one first information extraction device 120 and the at least one second information extraction device 130, and convert them to the same reference coordinate system to represent. The position information of the user has user coordinates of the user relative to the at least one first information extraction device 120, the position information of the target object has target object coordinates of the target object relative to the at least one second information extraction device 130, and the processing device 140 may convert the user coordinates and the target object coordinates to a same coordinate system, for example, the foregoing world coordinate system or camera coordinate system, and further obtain positions of the user and the target object in a three-dimensional space.

Incidentally, in an exemplary embodiment, because the relative positions of the display screen 110, the at least one first information extraction device 120, and the at least one second information extraction device 130 are known, the processor 142 may use the information extracted by the at least one first information extraction device 120 and/or the at least one second information extraction device 130 to estimate an initial position of the display screen 110 in the reference coordinate system. In another exemplary embodiment, the display screen 110 may further be provided with a locator, which may use communications technologies such as WiFi, RFID, Bluetooth, and ZigBee for indoor location or indoor and outdoor integrated location to perform location and coordinates conversion on the display screen 110, so as to obtain the initial position of the display screen 110 in the reference coordinate system.

Then, the processor 142 displays a fused image on the display screen according to the initial position of the user, the initial position of the target object, and the initial position of the display screen 110 (step S206). Herein, the processor 142 generates fused information between the user and the target object on the display screen 110 according to the initial position of the user, the initial position of the target object, and the initial position of the display screen 110. The processor 142 may use any eye-tracking algorithm to estimate gaze information of eyes of the user by using the initial position of the user and the initial position of the target object, to calculate a focus of the user on the display screen 110 (for example, a gaze range of the user), and perform image recognition on the target object according to an image captured by the at least one second information extraction device 130, to generate an image recognition result. Subsequently, the processing device 140 may generate fused information according to the focus and the image recognition result, and the fused information is used as a basis for generating the fused image. It can be reasonably assumed that the target object is located on the gaze of the user, and the processor 142 may use the image of the target object to perform image recognition on the target object according to the gaze information of the eyes, to obtain content of the physical scenario viewed by the user. The fused image may be guiding information of the target object, a virtual interaction object of the target object, or the like. This is not limited in the disclosure.

Subsequently, the processor 142 of the processing device 140 updates the fused image displayed on the display screen 110 according to at least one of a movement amount of the display screen 110 and a movement amount of the user (step S208). In the present exemplary embodiment, the processor 142 may determine whether the display screen 110 moves or rotates by using the at least one first information extraction device 120 and/or the at least one second information extraction device 130, and the processor 142 may determine whether the user moves, rotates or changes the gaze by using the at least one first information extraction device 120. If at least one of the foregoing is yes, it means that the original fused image cannot match the gaze of the user, and the fused image on the display screen 110 needs to be updated.

The movement amount of the display screen 110 herein is a displacement and/or a rotation angle of the display screen 110 in the reference coordinate system. In an exemplary embodiment, on the premise that the position information of the target object is constant, the processor 142 may determine the movement amount of the display screen 110 according to the position information of the target object extracted by the at least one second information extraction device 130. In an exemplary embodiment, the processor 142 may determine the movement amount of the display screen 110 according to position information of a fixed reference object extracted by the at least one first information extraction device 120 and/or the at least one second information extraction device 130. In another exemplary embodiment, the display screen 110 may also be additionally provided with a motion sensor, which may be, for example, an accelerator, a gyroscope or any sensor capable of detecting a linear movement amount, a linear movement direction, and a rotation angle of the display screen 110, to detect the movement amount of the display screen 110. On the other hand, the movement amount of the user is a gaze displacement of the user relative to the display screen 110. The processor 142 calculates the fused information according to the movement amount, to update the original fused image displayed on the display screen 110. In other words, when the position information of the display screen 110 or/and the user changes, the processor 142 needs to update the fused information according to the fixed reference coordinate system and the movement amount, without needing to recalculate the entire coordinate system, thereby greatly reducing a computation amount and a computation time.

For convenience and clarity, the following exemplary embodiments describe the details of the process in FIG. 2 in combination with different application scenarios of the display system 100. In the following exemplary embodiments, the at least one first information extraction device 120 and the at least one second information extraction device 130 are used as a group of image sensors C1 and C2 respectively. However, this is not limited in the disclosure. In addition, in the following exemplary embodiments, the display system 100 is described as a single integrated system. Therefore, the position of the display system 100 represents the position of the display screen 110. However, this is not limited in the disclosure.

Figure 3A:
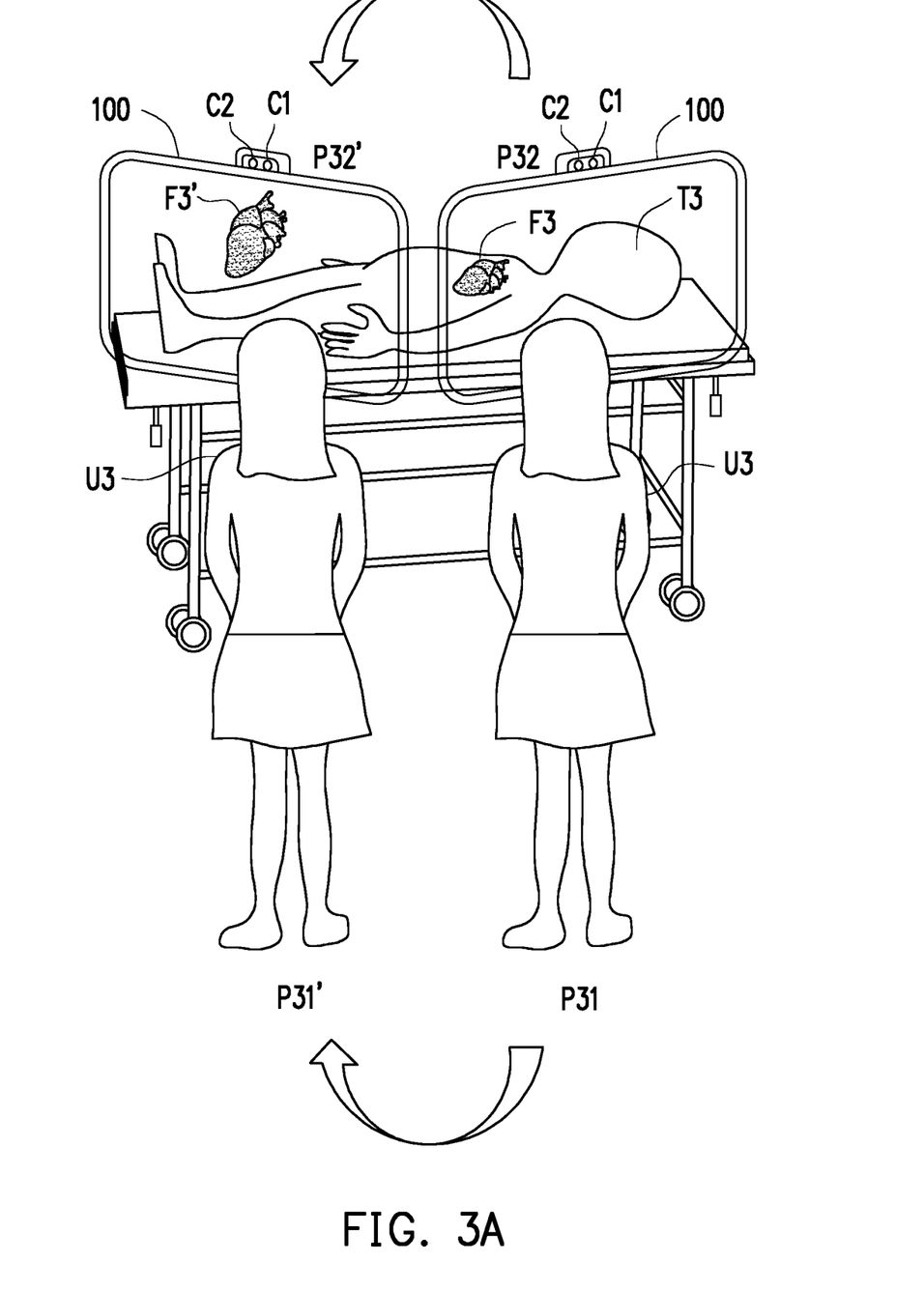
FIG. 3A is a schematic diagram illustrating an application scenario of a display system according to an exemplary embodiment of the disclosure.
Figure 3B:
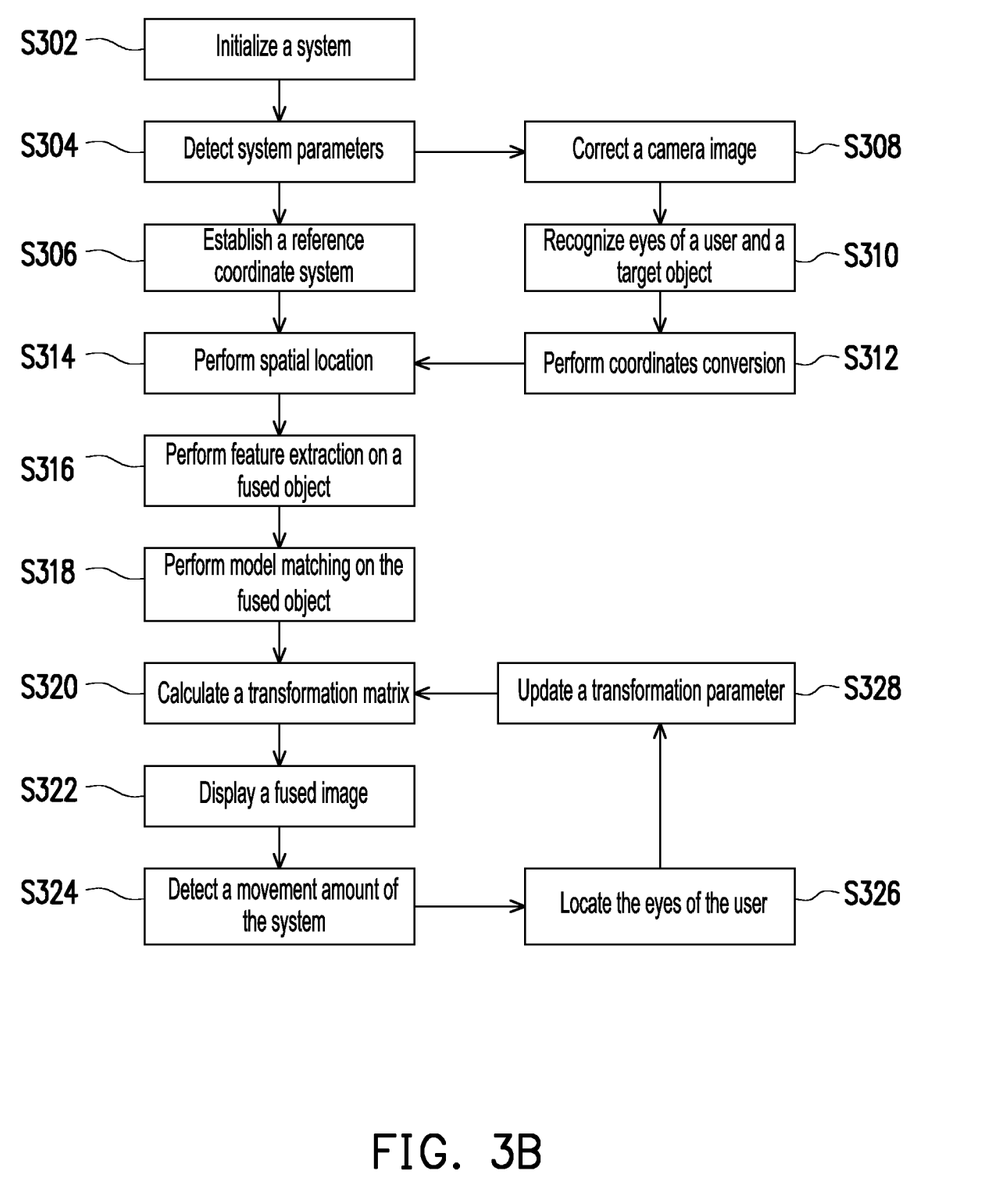
FIG. 3B is a flowchart illustrating a method for information display according to an exemplary embodiment of the disclosure.

FIG. 3A is a schematic diagram illustrating an application scenario of a display system according to an exemplary embodiment of the disclosure, and FIG. 3B is a flowchart illustrating a method for information display according to an exemplary embodiment of the disclosure.

Referring to FIG. 1 and FIG. 3A first, in the present exemplary embodiment, a user is, for example, a doctor U3, and a target object is, for example, a patient T3. An application scenario of the present exemplary embodiment is that before an operation, the doctor U3 moves the display system 100 to different positions, and views the patient T3 at different angles by using the display screen 110, so as to evaluate the patient T3 before the operation.

Referring to FIG. 1, FIG. 3A, and FIG. 3B, in the present exemplary embodiment, after the display system 100 is started, the processing device 140 starts to initialize the system (step S302), starts to detect system parameters (step S304), and further constructs a reference coordinate system (step S306). The system parameters herein may include related information extracted by the two groups of image sensors C1 and C2 in a scenario in which the display system 100 is located, and are used to construct a fixed reference coordinate system. Herein, the processing device 140 may also obtain an initial position of the display system 100 (namely, the display screen 110). On the other hand, the processing device 140 corrects a camera image for an image of the doctor U3 and an image of the patient T3 that are captured by the image sensors C1 and C2 (step S308), so as to align deviations of the different image sensors in a physical space and merge them into a same coordinate system. Herein, the processing device 140 may recognize eyes of the user and the target object for the image of the doctor U3 and the image of the patient T3 (step S310), to perform coordinates conversion on the eyes of the user and the target object (step S312), so as to obtain spatial positions of the doctor U3 and the patient T3 in the same reference coordinate system (step S314). In other words, the processing device 140 herein has obtained an initial position of the doctor U3, an initial position of the patient T3, and the initial position of the display screen 110.

The processing device 140 may, for example, perform coordinates conversion on the eyes of the user and the target object according to a formula (1) well known to a person skilled in the art:

$$s\begin{bmatrix}u\\v\\1\end{bmatrix} = \begin{bmatrix}a_x & s & u_0\\0 & a_y & v_0\\0 & 0 & 1\end{bmatrix}\begin{bmatrix}r_{11} & r_{12} & r_{13} & t_1\\r_{21} & r_{22} & r_{23} & t_2\\r_{31} & r_{32} & r_{33} & t_3\end{bmatrix}\begin{bmatrix}X\\Y\\Z\\1\end{bmatrix} = K[R|t]Q \quad \text{formula (1)}$$

where $$s\begin{bmatrix}u\\v\\1\end{bmatrix}$$

represents image plane coordinates, $$\begin{bmatrix}a_x & s & u_0\\0 & a_y & v_0\\0 & 0 & 1\end{bmatrix}$$

represents a camera internal parameter matrix, $$\begin{bmatrix}r_{11} & r_{12} & r_{13} & t_1\\r_{21} & r_{22} & r_{23} & t_2\\r_{31} & r_{32} & r_{33} & t_3\end{bmatrix}$$

represents a camera external parameter matrix, and $$\begin{bmatrix}X\\Y\\Z\\1\end{bmatrix}$$

represents world coordinates.

Then, the processing device 140 may first perform feature extraction on a fused object (step S316) and model matching on the fused object (step S318). The fused object herein is the related information to be displayed on the display screen 110 later, and may be stored in the memory 141 or obtained from other databases by using a communication interface (not shown). The processing device 140 may first perform model matching between the fused object and the gaze of the user and the physical scenario including the target object, to calculate a manner in which the fused image is to be presented on the display screen 110. In other words, the processing device 140 calculates a transformation matrix (step S320) as fused information. The processing device 140 then displays the fused image on the display screen 110 according to the fused information (step S322).

In the present exemplary embodiment, the processing device 140 may detect a movement amount of a system (step S324), locate the eyes of the user (step S326), and update the transformation parameter according to at least one of the movement amount of the system and the movement amount of the gaze (step S328), so as to return to the step S320 to recalculate the transformation matrix, thereby updating the fused image. That is, in the present exemplary embodiment, there is no need to re-construct a coordinate system, but instead, the transformation matrix needs to be updated according to any detected movement amount of the system and the movement amount of the gaze. For example, when the processing device 140 detects the movement amount of the gaze (to be specific, a position of the display screen 110 does not change, but the gaze of the user changes), the processing device 140 updates the transformation parameter according to the movement amount of the gaze.

For example, assuming that the processing device 140 detects the movement amount of the gaze (to be specific, displacements x, y, and z relative to X, Y, and Z axes), the processing device 140 updates the coordinates conversion for the eyes of the user.

$$\begin{bmatrix}t_1\\t_2\\t_3\end{bmatrix}$$

in an external parameter matrix of the formula (1) may become $$\begin{bmatrix}t_1 + x\\t_2 + y\\t_3 + z\end{bmatrix},$$

and a rotation amount of X, Y, and Z axes may be represented by formulas (2.1) to (2.3):

$$R(X_W, \phi) = \begin{bmatrix} 1 & 0 & 0 & 0 \\ 0 & \cos\phi & -\sin\phi & 0 \\ 0 & \sin\phi & \cos\phi & 0 \\ 0 & 0 & 0 & 1 \end{bmatrix} \quad \text{formula (2.1)}$$

$$R(Y_W, \theta) = \begin{bmatrix} \cos\theta & 0 & \sin\theta & 0 \\ 0 & 1 & 0 & 0 \\ -\sin\theta & 0 & \cos\theta & 0 \\ 0 & 0 & 0 & 1 \end{bmatrix}, \text{ and} \quad \text{formula (2.2)}$$

$$R(Z_W, \psi) = \begin{bmatrix} \cos\psi & -\sin\psi & 0 & 0 \\ \sin\psi & \cos\psi & 0 & 0 \\ 0 & 0 & 1 & 0 \\ 0 & 0 & 0 & 1 \end{bmatrix}. \quad \text{formula (2.3)}$$

In terms of FIG. 3A, it is assumed that the doctor U3 first views a heart area at a position P31 by using the display screen 110 located at a position P32, the processing device 140 may first obtain a three-dimensional heart image or a multi-angle plane heart image after stereoscopic conversion of the patient T3 from the database as the fused object, and the doctor U3 may view a fused image F3 superimposed on the patient T3 by using the display screen 110 for evaluation at the position P31. Subsequently, after the doctor U3 moves to a position P31' and the display screen 110 correspondingly moves to a position P32', the processing device 140 calculates the movement amount of the system and the movement amount of the gaze. The movement amount of the system is a displacement and a rotation angle of the display screen 110 moving from the position P32 to the position P32', and the movement amount of the gaze is a gaze displacement of the doctor U3 moving from the position P31 to the position P31'. When the doctor U3 views the heart area of the patient T3 at the position P31', the fused image F3' superimposed on the patient T3 may be viewed for evaluation at the position P31'. In addition, regardless of whether the doctor U3 is at the position P31 or P31', the display screen 110 may further correspondingly display operation guidance and evaluation information for the reference of the doctor U3.

Figure 4A:
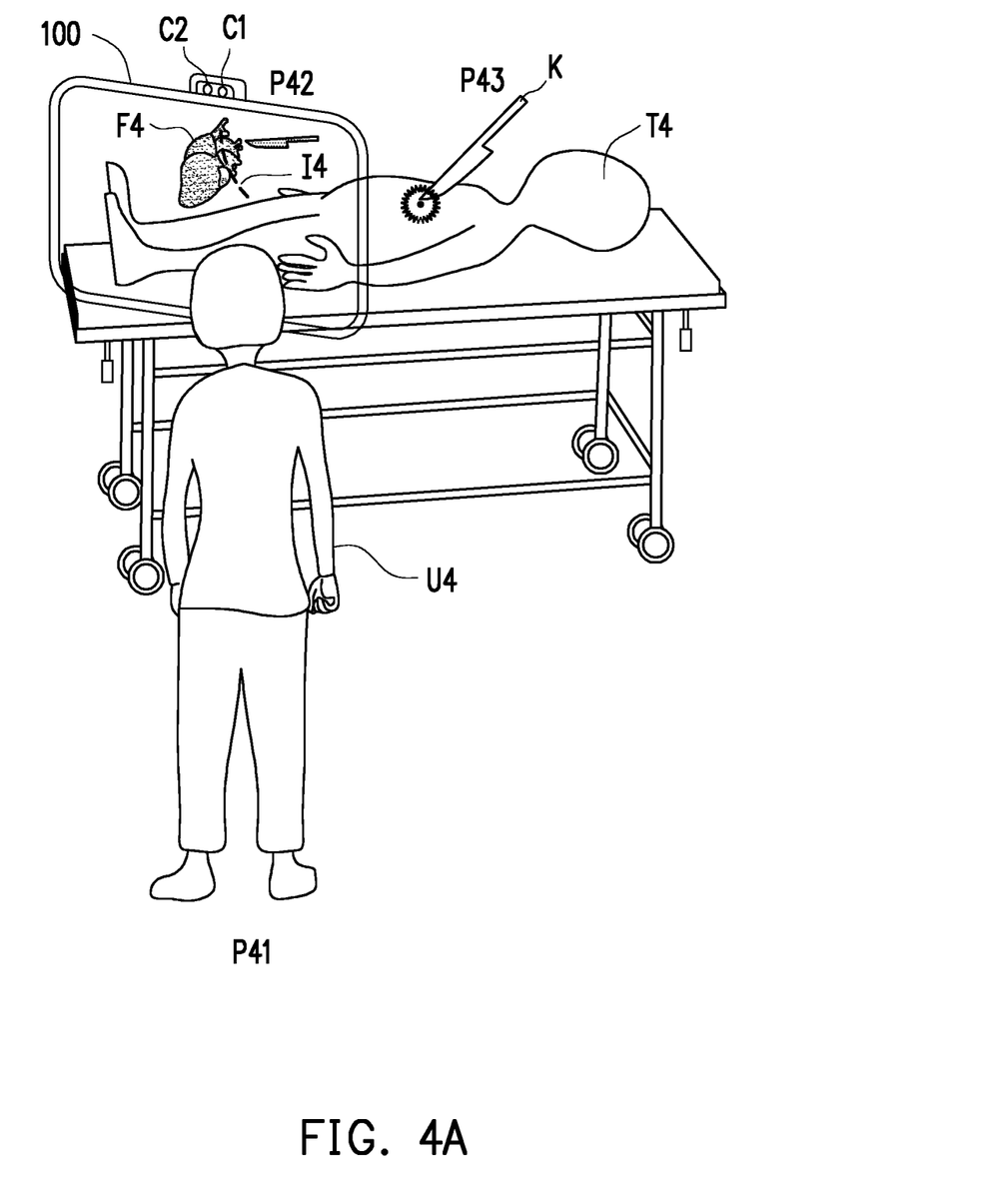
FIG. 4A is a schematic diagram illustrating an application scenario of a display system according to an exemplary embodiment of the disclosure.
Figure 4B:
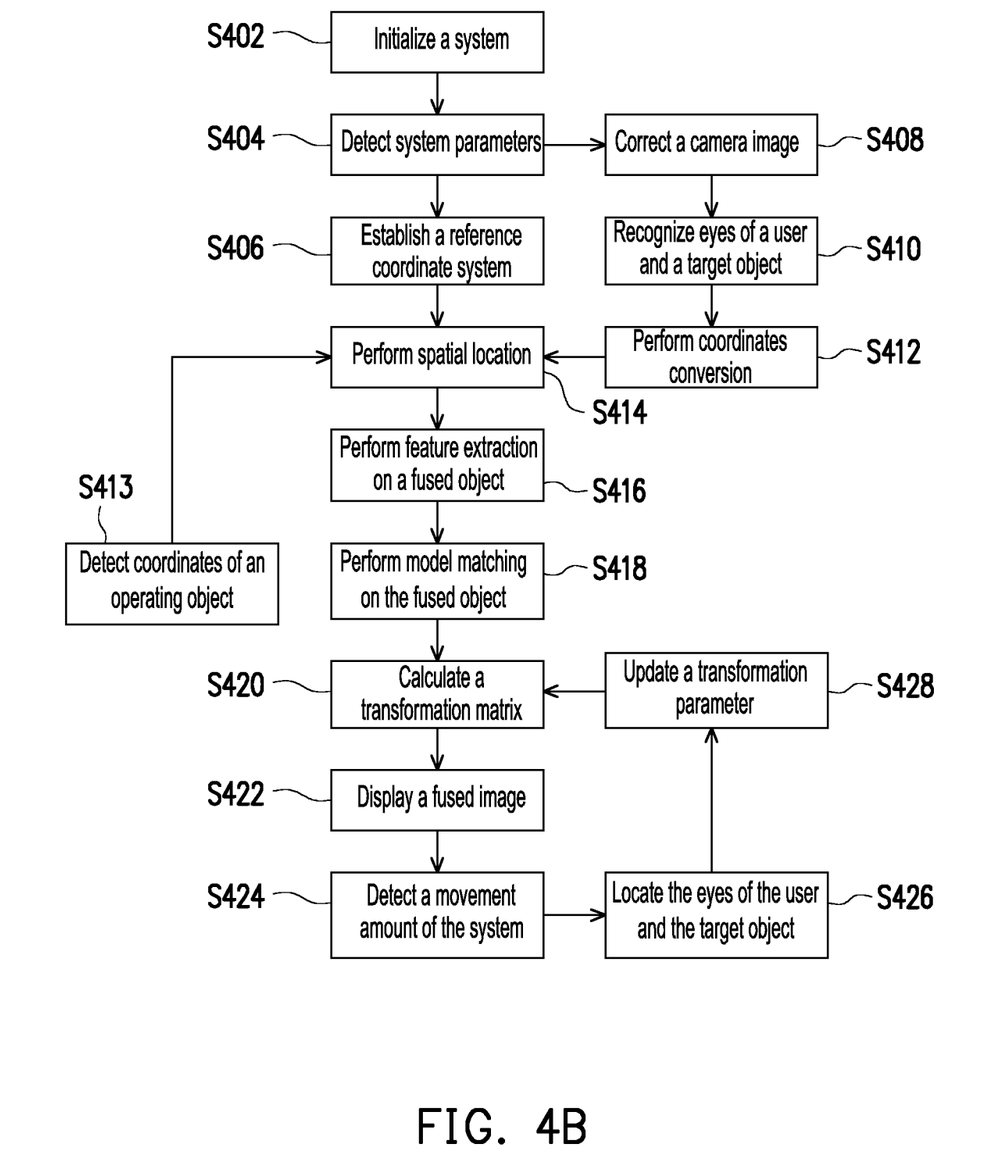
FIG. 4B is a flowchart illustrating a method for information display according to an exemplary embodiment of the disclosure.

FIG. 4A is a schematic diagram illustrating an application scenario of a display system according to an exemplary embodiment of the disclosure, and FIG. 4B is a flowchart illustrating a method for information display according to an exemplary embodiment of the disclosure. Compared with FIG. 3A and FIG. 3B, in the present exemplary embodiment, the user further holds an operating object for operating the target object, and steps in FIG. 4B indicated by reference signs having the same last two digits as those in FIG. 3B are similar to the steps in FIG. 3B, and reference may be made to FIG. 3B by a person of ordinary skill in the art for details, which are not described herein again.

First referring to FIG. 1 and FIG. 4A, in the present exemplary embodiment, the user is, for example, a doctor U4, the target object is, for example, a patient T4, and the operating object is, for example, an operation instrument K. An application scenario of the present exemplary embodiment is that before an operation, the doctor U4 views, at different angles, relative position information of the operation instrument K and an organ and guiding information by using the display screen 110 of the display system 100.

Referring to FIG. 4B, in the present exemplary embodiment, after the display system 100 is started, the processing device 140 starts to initialize the system (step S402), starts to detect system parameters (step S404), and further constructs a reference coordinate system (step S406). The system parameters herein may include related information extracted by two groups of image sensors C1 and C2 in a scenario in which the display system 100 is located, and are used to construct a fixed reference coordinate system. Herein, the processing device 140 may also obtain an initial position of the display system 100 (namely, the display screen 110). On the other hand, the processing device 140 corrects a camera image for an image of the doctor U4 and an image of the patient T4 that are captured by the image sensor C1 (step S408). Herein, the processing device 140 may recognize eyes of a user and the target object for the image of the doctor U4 and the image of the patient T4 (step S410), to perform coordinates conversion on the eyes of the user and the target object (step S412). On the other hand, the processing device 140 detects coordinates of the operating object (step S413), so as to obtain spatial positions of the doctor U4, the patient T4, and the operation instrument K in the same reference coordinate system (step S414). In other words, the processing device 140 has obtained an initial position of the doctor U4, an initial position of the patient T4, an initial position of the operation instrument K, and the initial position of the display screen 110.

Then, the processing device 140 may first perform feature extraction on a fused object (step S416) and feature matching on the fused object (step S418). Subsequently, the processing device 140 calculates a transformation matrix (step S420), so as to calculate fused information. The processing device 140 then displays the fused image on the display screen 110 (step S422). In the present exemplary embodiment, the processing device 140 detects a movement amount of the system (step S424), locates the eyes of the user and the operating object (step S426), and updates the transformation parameter according to at least one of the movement amount of the system and the movement amount of the gaze and a movement amount of an object (step S428), so as to return to the step S420 to recalculate the transformation matrix, thereby updating the fused image. That is, in the present exemplary embodiment, there is no need to re-construct a coordinate system, but instead, the transformation matrix needs to be updated according to at least one of any detected movement amount of the system and the movement amount of the gaze and the movement amount of the object.

In terms of FIG. 4A, it is assumed that the doctor U4 views a heart area of the patient T4 at a position P41 by using the display screen 110 located at a position P42, and the operation instrument K held by the doctor U4 is located at a position P43. The processing device 140 may first obtain a three-dimensional heart image or a multi-angle plane heart image after stereoscopic conversion from a database as a fused object, and the doctor U4 may view a fused image F4 superimposed on the patient T4. The fused image F4 may further include guiding information 14, to prompt the doctor U4 to perform a subsequent operation process according to, for example, a prompt line. Subsequently, the processing device 140 may correspondingly update the fused image F4 and the guiding information 14 included in the fused image according to a displacement and a rotation angle of the display screen 110, a gaze displacement of the doctor U4 and/or a displacement and a rotation angle of the operation instrument K.

Figure 5A:
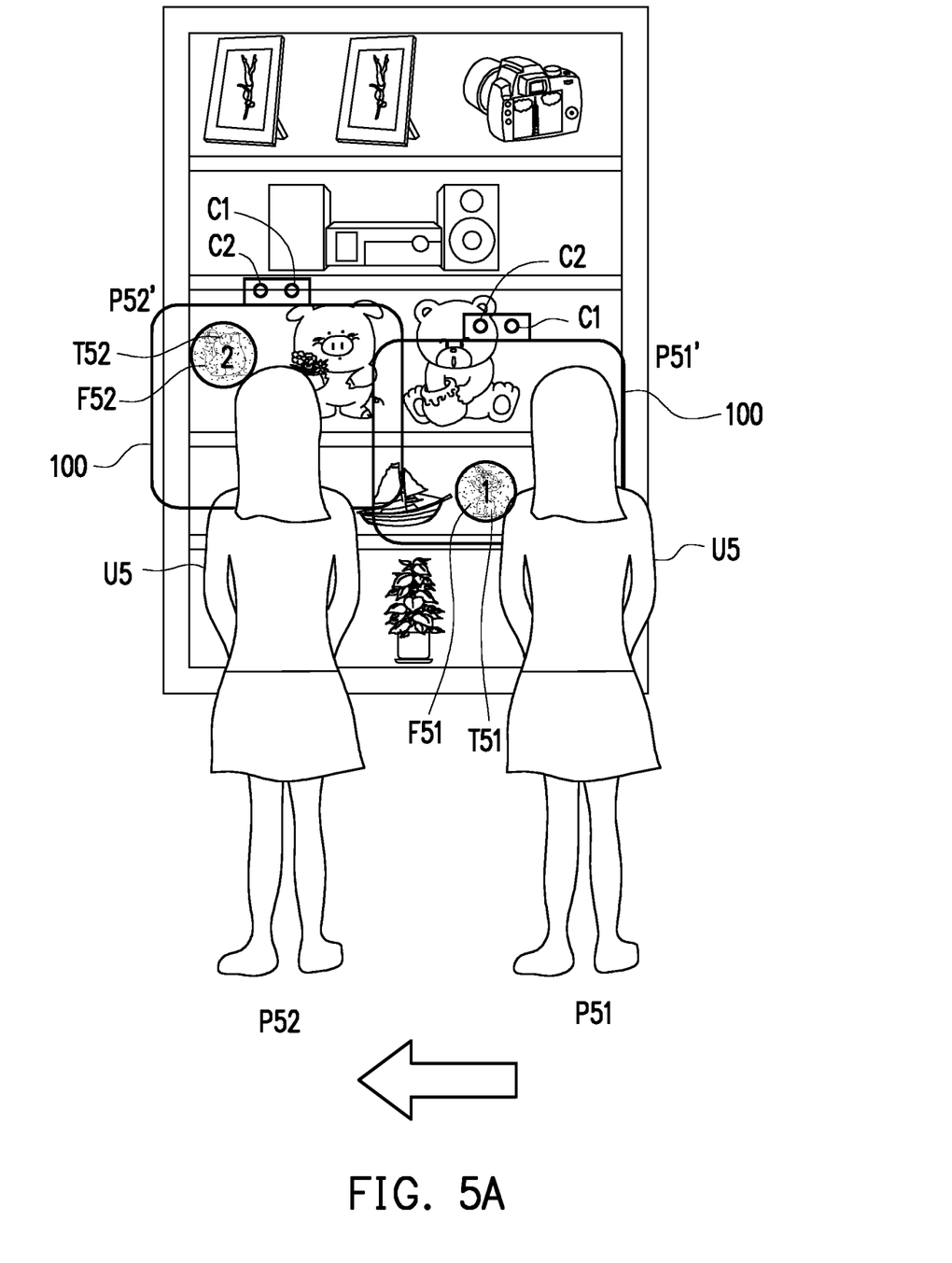
FIG. 5A is a schematic diagram illustrating an application scenario of a display system according to an exemplary embodiment of the disclosure.
Figure 5B:
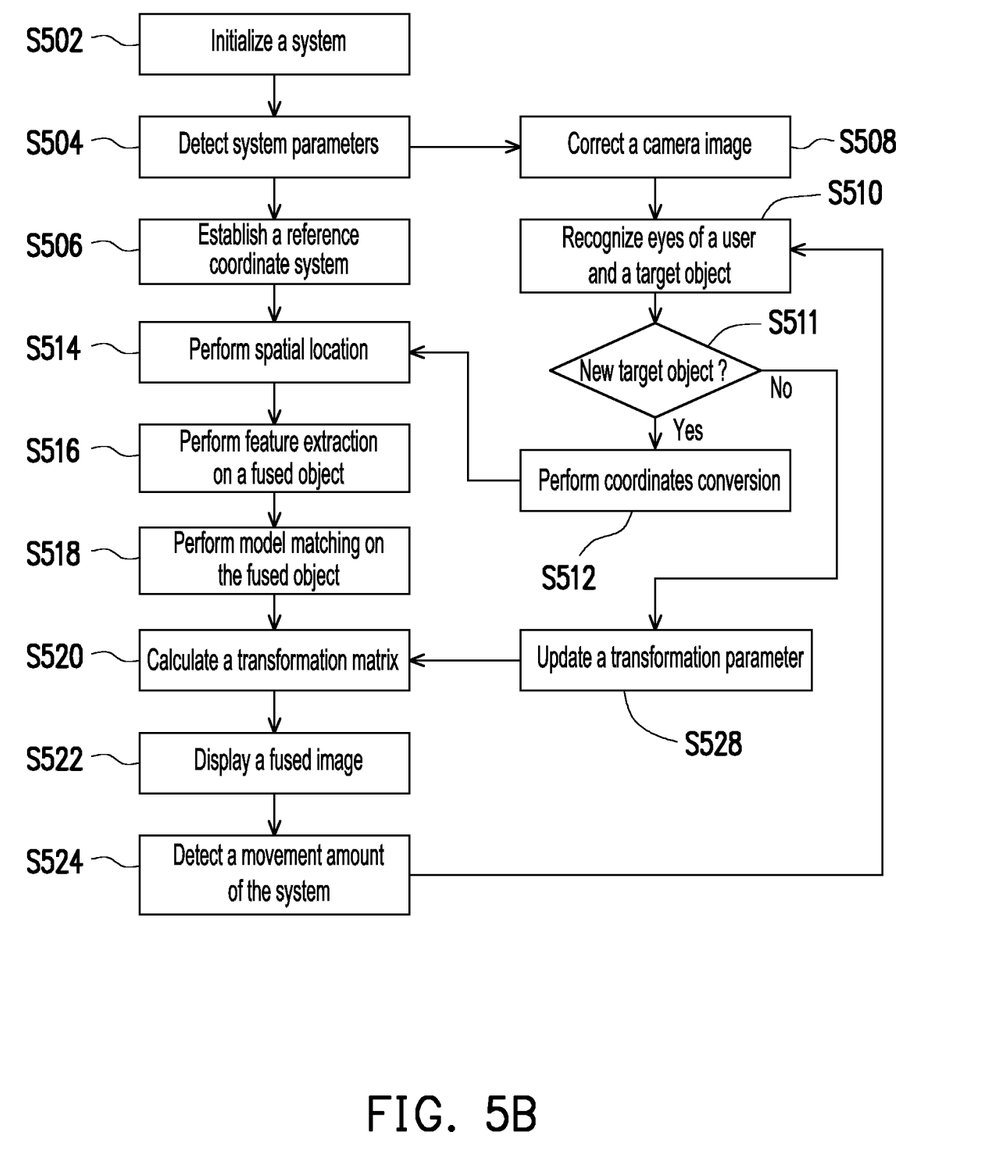
FIG. 5B is a flowchart illustrating a method for information display according to an exemplary embodiment of the disclosure.

FIG. 5A is a schematic diagram illustrating an application scenario of a display system according to an exemplary embodiment of the disclosure, and FIG. 5B is a flowchart illustrating a method for information display according to an exemplary embodiment of the disclosure. Compared with FIG. 3A and FIG. 3B, in the present exemplary embodiment, a usage field is a free space, and the target object behind the display screen 110 may change. In addition, steps in FIG. 5B indicated by reference signs having the same last two digits as those in FIGS. 3B and 4B are similar to steps in FIG. 3B and FIG. 4B, and reference may be made to FIG. 3B and FIG. 4B by a person of ordinary skill in the art for details, which are not described herein again.

Referring to FIG. 1 and FIG. 5A first, in the present exemplary embodiment, the application scenario is a retail field, the user is, for example, a client U5, and the target object is, for example, a plurality of products. The client U5 may move the display system 100 to different positions, and the target object behind the display screen 110 may change. In the present exemplary embodiment, a step for recognizing a new target object may be added.

Referring to FIG. 5B, in the present exemplary embodiment, after the display system 100 is started, the processing device 140 starts to initialize the system (step S502), starts to detect system parameters (step S504), and further constructs a reference coordinate system (step S506). The system parameters herein may include related information extracted by two groups of image sensors C1 and C2 in a scenario in which the display system 100 is located, and are used to construct a fixed reference coordinate system. Herein, the processing device 140 may also obtain an initial position of the display system 100 (namely, the display screen 110). On the other hand, the processing device 140 corrects a camera image for an image of the client U5 and an image of the product T51 that are captured by the image sensor C1 (step S508). The processing device 140 may recognize the eyes of the user and the target object for the image of the client U5 and the image of the product T51 (step S510), to determine whether there exists a new target object (step S511). This is an initialization phase of the system, and the processing device 140 views all target objects as new target objects, and performs coordinates conversion on the eyes of the user and the target object (step S512), to obtain spatial positions of the client U5 and the product T51 in the same reference coordinate system are obtained (step S514). In other words, the processing device 140 has obtained an initial position of the client U5, an initial position of the product T51, and the initial position of the display screen 110 herein.

Then, the processing device 140 may first perform feature extraction on a fused object (step S516) and feature matching on the fused object (step S518). Subsequently, the processing device 140 calculates a transformation matrix (step S520), so as to calculate fused information. The processing device 140 then displays the fused image on the display screen 110 (step S522). In the present exemplary embodiment, the processing device 140 detects a movement amount of the system (step S524), and returns to step S510 to recognize the target object again, so as to determine whether there exists a new target object in step S512. If there is a new target object (for example, a new product T52), the processing device 140 re-performs coordinates conversion on the client U5 and the new product T52, returns to step S514 to re-perform spatial location on the client U5 and the new product T52, and obtains a new fused object and related steps. On the other hand, if there is no new target object, the processing device 140 needs to update a transformation parameter according to the movement amount of the system and the movement amount of the gaze (step S528), to return to step S520 to calculate a transformation matrix, thereby updating the fused image.

In terms of FIG. 5A, it is assumed that the client U5 first views the product T51 at a position P51 by using the display screen 110 at a position P51', the processing device 140 may first obtain related information of the product T51 from the database as the fused object, and the client U5 may view a fused image F51 superimposed on the product T51, so as to obtain the related information of the product T51. Subsequently, after the client U5 moves to the position P51' and the display screen 110 correspondingly moves to a position P52', the client U5 views the new product T52, and the processing device 140 may first obtain related information of the new product T52 from the database as the fused object. The related information of the products T51 and T52 may be an introduction, a price, a usage manner, evaluation, and the like thereof. This is not limited in the disclosure.

Figure 6A:
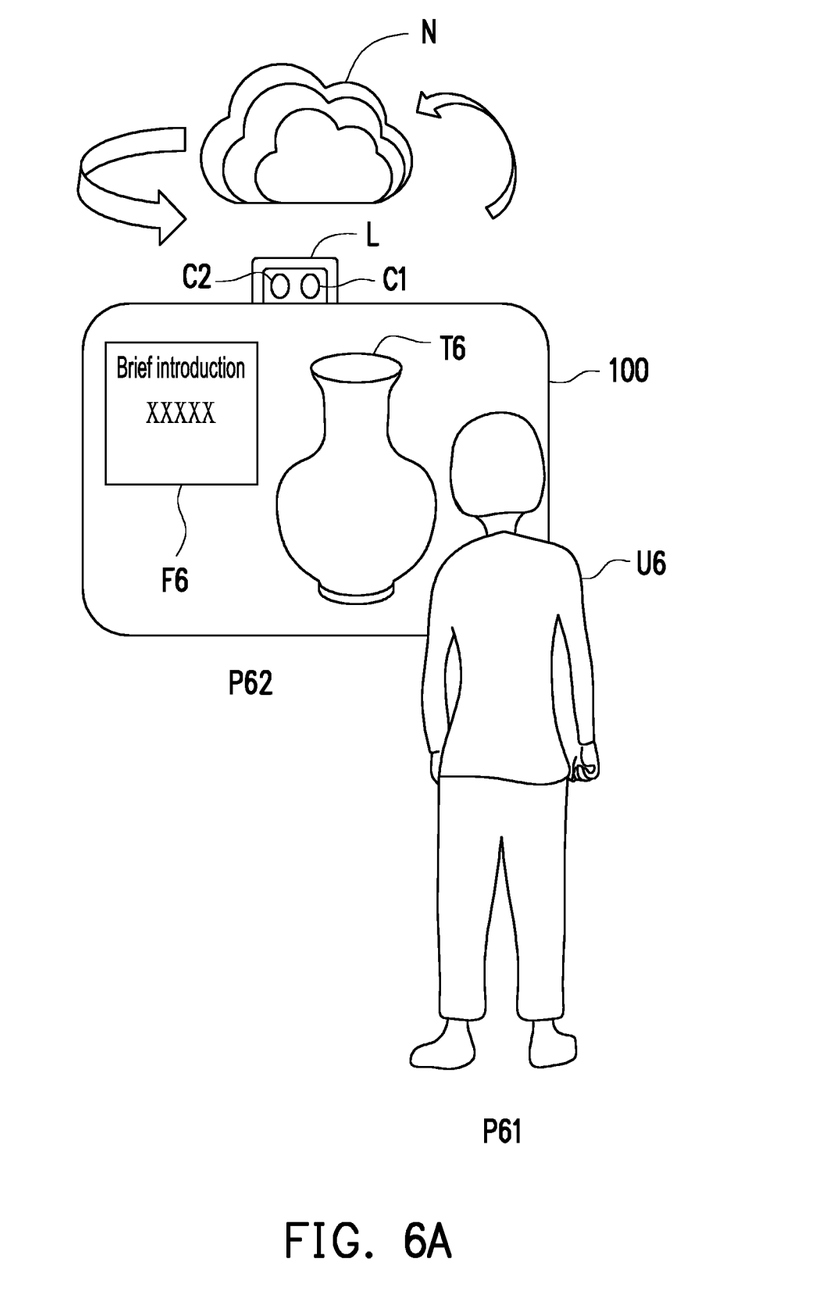
FIG. 6A is a schematic diagram illustrating an application scenario of a display system according to an exemplary embodiment of the disclosure.
Figure 6B:
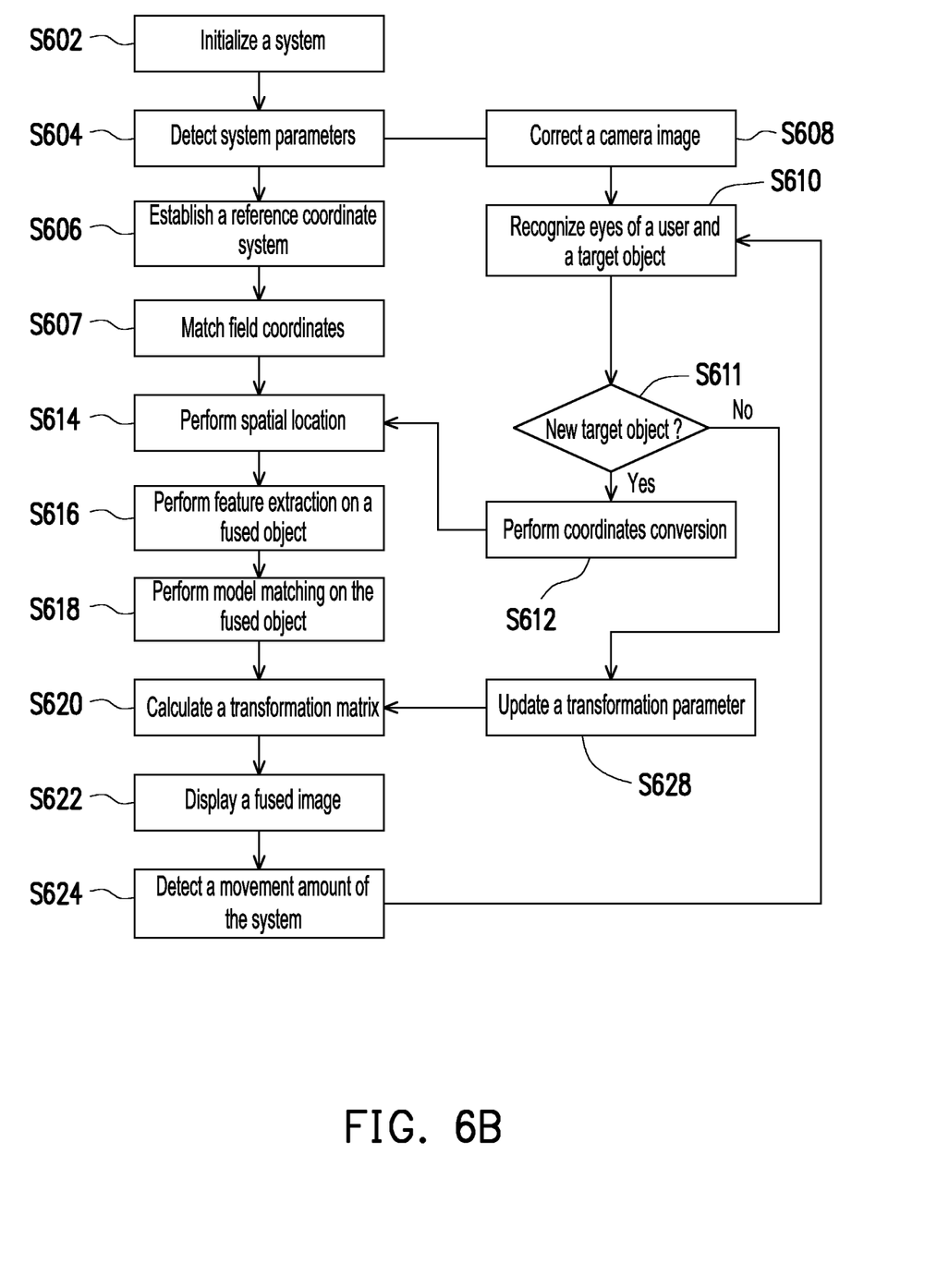
FIG. 6B is a flowchart illustrating a method for information display according to an exemplary embodiment of the disclosure.

FIG. 6A is a schematic diagram illustrating an application scenario of a display system according to an exemplary embodiment of the disclosure, and FIG. 6B is a flowchart illustrating a method for information display according to an exemplary embodiment of the disclosure. Compared with FIG. 3A, FIG. 3B, FIG. 4A, and FIG. 4B, in the present exemplary embodiment, a usage field is a free space, and therefore, a target object behind the display screen 110 may change. Compared with FIG. 5A and FIG. 5B, after entering the usage field, the display system 100 of the present exemplary embodiment matches with a coordinate system of the usage field. In addition, steps in FIG. 6B indicated by reference signs having the same last two digits as those in FIG. 3B, FIG. 4B, and FIG. 5B are similar to steps in FIG. 3B, FIG. 4B, and FIG. 5B, and reference may be made to FIG. 3B, FIG. 4B, and FIG. 5B by a person of ordinary skill in the art for details, which are not described herein again.

Referring to FIG. 1 and FIG. 6A first, in the present exemplary embodiment, the application scenario is an exhibition hall, the user is, for example, a visitor U6, and the target object is, for example, an exhibit T6. The exhibition hall may provide its own field coordinate system, and after entering a field of the exhibition hall, the display system 100 may match with the field coordinate system of the exhibition hall, so as to reduce information stored in the display system 100.

Referring to FIG. 6B, in the present exemplary embodiment, after the display system 100 is started, the processing device 140 starts to initialize the system (step S602), starts to detect system parameters (step S604), and further constructs a reference coordinate system (step S606). The system parameters herein may include related information extracted by two groups of image sensors C1 and C2 in a scenario in which the display system 100 is located, and are used to construct a fixed reference coordinate system. Then, the display system 100 may obtain the field coordinate system of the exhibition hall from a network N by using a communication interface (not shown), to match field coordinates (step S607). Incidentally, in the present exemplary embodiment, the display system 100 may further be additionally provided with a locator L for locating a position of the display system 100 at any time.

On the other hand, the processing device 140 may correct a camera image for an image of the visitor U6 and an image of the exhibit T6 that are captured by the image sensor C1 (step S608). Herein, the processing device 140 may recognize eyes of a user and a target object for the image of the visitor U6 and the image of the exhibit T6 (step S610), to determine whether there is a new target object (step S611). This is an initialization phase of the system, and the processing device 140 views all target objects as new target objects, and performs coordinates conversion on the eyes of the user and the target object (step S612), to obtain spatial positions of the visitor U6 and the exhibit T6 in the same reference coordinate system (step S614). In other words, the processing device 140 has obtained an initial position of the visitor U6, an initial position of the exhibit T6, and an initial position of the display screen 110.

Then, the processing device 140 may first perform feature extraction on a fused object (step S616) and feature matching on the fused object (step S618). Subsequently, the processing device 140 calculates a transformation matrix (step S620), so as to calculate fused information. The processing device 140 then displays the fused image on the display screen 110 (step S622). In the present exemplary embodiment, the processing device 140 detects a movement amount of the system (step S624), and returns to step S610 to recognize the target object again, so as to determine whether there is a new target object in step S612. If there is a new target object, the processing device 140 re-performs coordinates conversion on the visitor U6 and a new exhibit, returns to step S614 to re-perform spatial location on the visitor U6 and the new exhibit, and obtains a new fused object and related steps. On the other hand, if there is no new target object, the processing device 140 needs to update a transformation parameter according to any detected movement amount of the system and the movement amount of the gaze (step S628), to return to step S620 to calculate a transformation matrix, thereby updating the fused image.

In terms of FIG. 6A, it is assumed that the visitor U6 views the exhibit T6 at a position P6, the processing device 140 may first obtain related information of the exhibit T6 by using the network N from the database as the fused object, and the visitor U6 may view a fused image F6 superimposed on the exhibit T6, to obtain the related information such as an introduction of the exhibit T6. Subsequently, the processing device 140 may correspondingly update the fused image F6 according to a displacement and a rotation angle of the display screen 110 and a gaze displacement of the visitor U6.

According to the method for information display, the processing device, and the display system provided in the exemplary embodiments of the disclosure, a fixed reference coordinate system is constructed when the system is started, and after an initial position of a user, an initial position of a target object, and an initial position of a display screen are located, a fused image may be updated according to a detected movement amount of the user and/or a detected movement amount of the display screen, thereby greatly reducing a computation amount and a computation time.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A display system comprising:
a light transmissive display screen;
at least one first information extraction device, configured to extract position information of a user;
at least one second information extraction device, configured to extract position information of a target object; and
a processing device, connected to the display screen, the at least one first information extraction device, and the at least one second information extraction device, and configured to:
construct a fixed reference coordinate system, and locate an initial position of the user, an initial position of the target object, and an initial position of the display screen in the fixed reference coordinate system;
display a fused image on the display screen according to the initial position of the user, the initial position of the target object, and the initial position of the display screen;
in response to a movement of the display screen being detected, update the fused image by using a movement amount of the movement of the display screen in the fixed reference coordinate system;
in response to a movement of the user being detected, update the fused image by using a movement amount of the movement of the user in the fixed reference coordinate system; and
in response to the movement of the display screen and the movement of the user being detected, update the fused image by using the movement amount of the movement of the display screen in the fixed reference coordinate system and the movement amount of the movement of the user in the fixed reference coordinate system.

2. The display system according to claim 1, wherein the processing device determines the movement amount of the movement of the display screen in the fixed reference coordinate system by using the at least one first information extraction device and the at least one second information extraction device.

3. The display system according to claim 1, wherein the movement amount of the movement of the display screen is a displacement or a rotation angle of the display screen.

4. The display system according to claim 1, wherein the processing device determines the movement amount of the movement of the user in the fixed reference coordinate system by using the at least one first information extraction device.

5. The display system according to claim 1, wherein the movement amount of the movement of the user is a gaze displacement of the user.

6. The display system according to claim 1, wherein:
the at least one first information extraction device comprises an image sensor, and the at least one second information extraction device comprises an image sensor, and wherein the at least one first information extraction device and the at least one second information extraction device are respectively disposed on two opposite sides of the display screen.

7. The display system according to claim 6, wherein:
the at least one first information extraction device and the at least one second information extraction device further comprise a depth sensor.

8. The display system according to claim 6 further comprising:
a motion sensor, disposed on the display screen, and configured to detect the movement amount of the movement of the display screen.

9. The display system according to claim 6 further comprising:
a locator, disposed on the display screen, and configured to obtain position information of the display screen.

10. The display system according to claim 1, wherein the fused image is associated with a transformation matrix, and the processing device updates a transformation parameter of the transformation matrix according to the at least one of the movement amount of the movement of the display screen and the movement amount of the movement of the user to accordingly update the fused image.

11. The display system according to claim 10, wherein the processing device updates the transformation parameter of the transformation matrix according to the movement amount of the movement of the display screen and the movement amount of the movement of the user to accordingly update the fused image.

12. The display system according to claim 10, wherein:
the processing device updates the transformation parameter of the transformation matrix according to the movement amount of the movement of the user to accordingly update the fused image.

13. The display system according to claim 12, wherein the fused image comprises guiding information associated with the target object.

14. The display system according to claim 10, wherein:
the user holds an operating object to operate the target object, and the at least one second information extraction device is further configured to extract position information of the operating object;
the processing device displays the fused image on the display screen according to the initial position of the user, the initial position of the target object, the initial position of the display screen, and an initial position of the operating object; and
the processing device updates the transformation parameter of the transformation matrix according to the at least one of the movement amount of the movement of the display screen and the movement amount of the movement of the user and a movement amount of a movement of the operating object to accordingly update the fused image.

15. The display system according to claim 14, wherein the movement amount of the movement of the operating object is a displacement or a rotation angle of the operating object.

16. The display system according to claim 10, wherein:
the processing device further determines whether there exists a new target object by using the at least one second information extraction device; and
when the processing device determines that the new target object exists, the processing device displays a new fused image on the display screen according to the at least one of the movement amount of the movement of the display screen and the movement amount of the movement of the user and position information of the new target object.

17. The display system according to claim 10, wherein:
the processing device further determines whether a new target object exists by using the at least one second information extraction device; and
when the processing device determines that the new target object does not exist, the processing device updates the transformation parameter of the transformation matrix according to the at least one of the movement amount of the movement of the display screen and the movement amount of the movement of the user to accordingly update the fused image.

18. The display system according to claim 10, wherein:
the processing device further obtains a field coordinate system of a usage field of the display system and performs matching on the fixed reference coordinate system and the field coordinate system, so as to locate the initial position of the user, the initial position of the target object, and the initial position of the display screen.

19. The display system according to claim 1, wherein:
the processing device updates the fused image by using at least one of the movement amount of the movement of the display screen in the fixed reference coordinate system and the movement amount of the movement of the user in the fixed reference coordinate system and by using at least one of the initial position of the display screen and the initial position of the user.

20. A method for information display, applicable to a display system having a light transmissive display screen, at least one first information extraction device, at least one second information extraction device, and a processing device, wherein the at least one first information extraction device is configured to extract position information of a user, the at least one second information extraction device is configured to extract position information of a target object, and wherein the method comprises:
constructing a fixed reference coordinate system, and locating an initial position of the user, an initial position of the target object, and an initial position of the display screen in the fixed reference coordinate system;
displaying a fused image on the display screen according to the initial position of the user, the initial position of the target object, and the initial position of the display screen;
in response to a movement of the display screen being detected, updating the fused image by using a movement amount of the movement of the display screen in the fixed reference coordinate system;
in response to a movement of the user being detected, updating the fused image by using a movement amount of the movement of the user in the fixed reference coordinate system; and
in response to the movement of the display screen and the movement of the user being detected, updating the fused image by using the movement amount of the movement of the display screen in the fixed reference coordinate system and the movement amount of the movement of the user in the fixed reference coordinate system.

21. A processing device, connected to a light transmissive display screen, at least one first information extraction device, and at least one second information extraction device, wherein the at least one first information extraction device is configured to extract position information of a user, the at least one second information extraction device is configured to extract position information of a target object, and the processing device comprises:
a memory, configured to store data; and
a processor, configured to:
construct a fixed reference coordinate system, and locate an initial position of the user, an initial position of the target object, and an initial position of the display screen in the fixed reference coordinate system;
display a fused image on the display screen according to the initial position of the user, the initial position of the target object, and the initial position of the display screen;
in response to a movement of the display screen being detected, update the fused image by using a movement amount of the movement of the display screen in the fixed reference coordinate system;

in response to a movement of the user being detected, update the fused image by using a movement amount of the movement of the user in the fixed reference coordinate system; and in response to the movement of the display screen and the movement of the user being detected, update the fused image by using the movement amount of the movement of the display screen in the fixed reference coordinate system and the movement amount of the movement of the user in the fixed reference coordinate system.

\* \* \* \* \*